United States Patent
Ludin

(10) Patent No.: US 9,855,739 B2
(45) Date of Patent: Jan. 2, 2018

(54) MEASURING ELEMENT, DEVICE AND METHOD FOR SETTING OR CONTROLLING AN APPLICATION PRESSURE

(71) Applicant: CONPRINTA GmbH & Co. KG, Goettingen (DE)

(72) Inventor: Guntmar-Michael Ludin, Kippenheim (DE)

(73) Assignee: CONPRINTA GmbH & Co. KG, Goettingen (DE)

( * ) Notice: Subject to any disclaimer, the term of this patent is extended or adjusted under 35 U.S.C. 154(b) by 0 days.

(21) Appl. No.: 14/900,391

(22) PCT Filed: Jun. 27, 2014

(86) PCT No.: PCT/EP2014/001765
§ 371 (c)(1),
(2) Date: Dec. 21, 2015

(87) PCT Pub. No.: WO2014/206571
PCT Pub. Date: Dec. 13, 2014

(65) Prior Publication Data
US 2016/0159082 A1 Jun. 9, 2016

(30) Foreign Application Priority Data
Jun. 28, 2013 (DE) .................. 10 2013 010 763

(51) Int. Cl.
*B41F 33/00* (2006.01)
*G01L 5/00* (2006.01)

(52) U.S. Cl.
CPC ........ *B41F 33/0072* (2013.01); *G01L 5/0085* (2013.01)

(58) Field of Classification Search
CPC .............................. B41M 1/04; B41F 33/0072
See application file for complete search history.

(56) References Cited

U.S. PATENT DOCUMENTS

2009/0126591 A1*  5/2009  Puig Vila ............... B41F 13/24
                                                            101/486

FOREIGN PATENT DOCUMENTS

| DE | 10 2008 025 287 A1 | 12/2009 |
|---|---|---|
| DE | 10 2010 000 907 A1 | 7/2011 |
| DE | 10 2011 001 920 A1 | 8/2011 |
| DE | 10 2011 122 932 B3 | 10/2013 |
| EP | 1 477 315 A1 | 11/2004 |
| EP | 2 012 104 A2 | 7/2009 |
| JP | 63-191638 A * | 8/1988 |
| WO | 2013/063173 A1 | 5/2013 |

OTHER PUBLICATIONS

Human translation of Yamanaka et al. (JP 63-191638), obtained Aug. 16, 2017.*

* cited by examiner

*Primary Examiner* — Matthew G Marini
*Assistant Examiner* — Michael Robinson
(74) *Attorney, Agent, or Firm* — Whitham, Curtis & Cook, P.C.

(57) ABSTRACT

The invention relates to a measuring element for flexo printing elements (11) for controlling an application pressure with respect to a printing material support (2), having several printing planes (7, 8, 9) which reduce in the upward direction and do not cover in the surface.

15 Claims, 2 Drawing Sheets

MEASURING ELEMENT, DEVICE AND METHOD FOR SETTING OR CONTROLLING AN APPLICATION PRESSURE

The invention relates to a measuring element for flexo printing elements for controlling an application pressure with respect to a printing material support. The invention likewise relates to a device for setting an application pressure of a flexo printing element with respect to a printing material support, in which a measuring element is arranged on the flexo printing element. Likewise, the invention relates to a method for controlling an application pressure of a flexo printing element with respect to a printing material support.

What is known as flexo printing is a relief printing process in which all the printing elements are elevated and are located at the same level. Non-imaging parts or non-printing elements are deepened in relation to the printing elements. Using an inking roll, what is known as the anilox roll, the printing elements of the flexo printing elements are inked. Following the inking of the printing elements or the printing form, a transfer to the printing material takes place. In order to ensure a uniform transfer of ink from the printing element to the printing material, a minimum pressure is necessary, which is ensured by an application pressure of the printing element with respect to the printing material support. The inking of the printing elements is normally carried out via a roll, the printing elements themselves are arranged on a printing roll, the printing material runs on the flexo printing element on the surface of the printing roll, so that the application pressure between the flexo printing element and the printing material support is provided by means of an assignment of the printing roll with respect to the printing material support roll.

The flexo printing elements or the plate are elastic and are deformed by the application pressure, so that the printing image elements are also deformed. With increasing application pressure, the deformation becomes more intense, so that the printing elements print more widely, which can lead to the printed image becoming imprecise. If the application pressure and therefore also the contact pressure of the printing material with respect to the flexo printing elements are too low, the transfer of ink is non-uniform.

The setting of the minimum contact pressure is carried out via the operating personnel on the respective press. In order to be able to carry out a precise setting, it requires experienced operating personnel, which means that the setting of the contact pressure depends on individual components. In order to assist the operating personnel, provision is made to arrange beside the plate a measuring element which has fine parallel or concentric lines. If the contact pressure becomes too high, the printing image elements are deformed so highly that the interspaces disappear. This is an indication of too high a contact pressure. However, the disappearance of lines can also have other causes, for example contaminants or deposits of ink pigments, so a reliable indication is not possible. Furthermore, the fine lines are difficult to see.

It is therefore an object of the present invention to provide a measuring element for flexo printing elements, a device for setting the application pressure of a flexo printing element with respect to a printing material support and a method for controlling an application pressure of a flexo printing element with which it is possible to find a minimum pressure or a threshold pressure quickly, in order to ensure reliable transfer of ink and at the same time to avoid over-pressing.

According to the invention, this object is achieved by a measuring element having the features of the main claim and a device and a method having the features of the independent claims. Advantageous refinements and developments of the invention are disclosed in the sub claims, the description and the figures.

The measuring element according to the invention for controlling an application pressure with respect to a printing material support provides a plurality of printing planes which reduce in height and which do not cover one another in the area. As a result of this configuration, it is possible to provide a stepped measuring element, similar to a pyramid, in which the printing planes lying lower down, for example, increase in size or else are at least not covered completely by the printing plane lying above, so that, depending on the application pressure, a printed image that varies in size and/or shape results. The first plane of the measuring element prints first, as soon as contact with the inking component, for example the anilox roll, takes place and the measuring element subsequently comes into contact with the printing material. The application pressure present in the first printing contact is generally not yet sufficient to ensure a uniform print for the actual printing motif, so that the pressure between the printing material support and the flexo printing element is increased until at least one further or more printing planes lying deeper print. As soon as the previously defined printing plane is reached, the desired or chosen application pressure is reached, being sufficient firstly to ensure a uniform transfer of ink and secondly to ensure a precise printed image.

The shape and/or orientation of the printing areas of the measuring element can be different in the different planes, so that, for example, a triangle is printed in the first plane, a square in the following one and a circle in the third, lowest printing plane. As a result, detection of the application pressure is possible not merely via an increase in size in the case of increasing, pyramidally configured printing areas in decreasing printing planes, but also in a simple manner by detecting different shapes or orientations of shapes.

The printing planes of the measuring element are advantageously spaced apart uniformly from one another in height, so that a finely graduated, uniform change in the application pressure can be represented by the measuring element by using the changing printed areas, orientations or shapes. In principle, it is also possible that a decreasing spacing of the printing planes in the direction of the target application pressure is provided, in order to be able to permit the finest and most precise possible setting.

The measuring element is advantageously arranged beside a printing motif on the flexo printing element, in order not to impair the actual printing motif.

The device according to the invention for setting an application pressure of a flexo printing element with respect to a printing material support, in which a measuring element, as described above, is arranged on the flexo printing element, provides for an image capturing means to be assigned to the printing material support in order to acquire the printed image of the measuring element on the printing material. Via the image capturing means, it is possible to acquire the shape and/or size of the printed image of the measuring element, so that an optical measurement of the application pressure can be achieved via an image comparison. A specific printed image of the measuring element, for example a size or a shape, is assigned a specific application pressure. If a specific printed result of the measuring element is achieved, the desired application pressure is present; if a printed image deviating therefrom is detected, the desired application pressure is not set and can be corrected. On the basis of the shape and/or size of the printed image of the measuring element, a qualitative and quantitative statement is possible as to the direction in which the application pressure must be changed and how large the change should be made.

The image capturing means can be assigned an evaluation device for the image data, so that automatic image evaluation can take place.

A comparator can be integrated in the device or assigned to the latter, comparing the acquired image data with previously stored patterns, so that, by means of a simple pattern comparison, it is possible to detect how and to what extent the application pressure must be varied.

There may be an output unit, which outputs a signal in the event of a deviation between a set point and an actual value or when a set point for image data from the measuring element is reached. The output unit can output an acoustic and/or visual signal, so that the operating personnel are shown the state in which the press is found and whether and in which direction the application pressure must be varied.

A development of the invention provides for a control device and an actuating drive for changing the application pressure to be assigned to the image capturing means, so that, following the image acquisition and the image evaluation, the application pressure can automatically be changed suitably by the actuating drive.

The method according to the invention for controlling an application pressure of a flexo printing element with respect to a printing material support, comprising a device described above, provides that the printed image of the measuring element is acquired and for the application pressure is set depending on the evaluated printed image of the measuring element. The application pressure can be set in accordance with the size and/or shape of the printed image of the measuring element.

Exemplary embodiments of the invention will be explained in more detail below by using the appended figures, in which.

Figure 1:
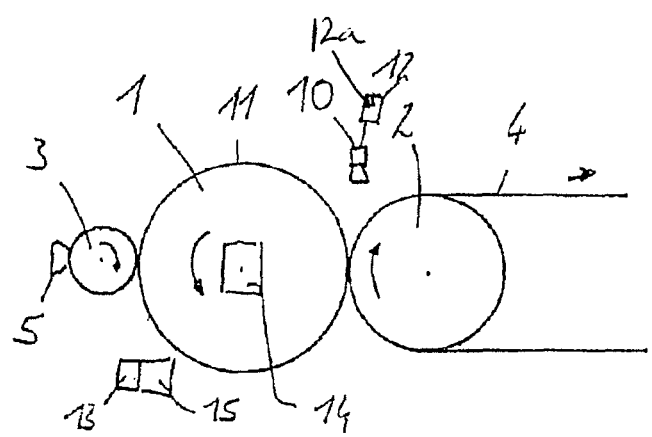
FIG. 1 shows a schematic illustration of a printing unit.

FIG. 1 shows a schematic illustration of a printing unit comprising a printing form carrier formed as a printing form cylinder 1 and having a flexo printing element 11 arranged on the surface of the printing form carrier. The printing form cylinder 1 rotates about its axis; on the surface of the flexo printing element 11 there runs a printing material 4 which is pressed against the flexo printing element 11 on the printing form cylinder 1 via an impression cylinder 2 as printing material support. In order to provide the flexo printing element 11 with an ink, an anilox roll 3, which is assigned a chamber-type doctor system 5, is arranged on the side of the printing form cylinder 1 opposite the impression cylinder 2.

In flexo printing, the respective cylinder axes are arranged parallel to each other. The contact pressure between the printing form cylinder 1 and the impression cylinder 2, and therefore the flexo printing element 11 with respect to the printing material 4, is freely adjustable, likewise the contact pressure of the anilox roll 3 against the flexo printing element 11 is adjustable. The printing unit illustrated is a direct relief printing process in web fed rotary printing, in which flexible printing plates are fixed to the printing form cylinder 1 as flexo printing elements 11. The flexo printing elements can consist of a photopolymer or rubber and are wetted with low-viscosity printing inks. The elevated points of the flexo printing elements 11 are image-carrying, which means that the inks which are located on the elevated points of the flexo printing elements 11 are printed on the printing material web 4. In principle, it is possible, in addition to the web fed rotary printing process, also to carry out other relief printing processes with flexo printing elements, for example flat flexo printing elements.

Via the chamber-type doctor system 5 assigned to the engraved roll 3, ink is applied continuously to the rotating engraved roll 3. The quantity of ink supplied is regulated by the chamber-type doctor system 5 and a uniform application of ink over the entire engraved roll length is ensured. From the engraved roll 3, the ink is applied to the printing form cylinder 1 in a manner rolling on the flexo printing element 11 rotating in the opposite direction. From said cylinder, the elevated points of the flexo printing element 11 print the motif onto the printing material web. Depending on the contact pressure of the flexo printing element 11 with respect to the printing material web 4, a different printing response occurs. If the application pressure with respect to the printing material web 4 is too low, a non-uniform transfer of ink from the flexo printing element 11 onto the printing material web 4 takes place. If the application pressure is too high, the elastic flexo printing elements are deformed, which leads to a change in the printed image. The elevated points of the flexo printing element 11 deform too highly, so that the precision of the printed image suffers, the elevated points print too widely.

In order to set the application pressure in the exemplary embodiment illustrated, an actuating drive 14 is assigned to the printing form cylinder 1; alternatively, it is possible to equip the impression cylinder 2 or both rolls with an appropriate actuating drive in order to effect a displacement of the axes toward each other or away from each other. The anilox roll 3, the printing form cylinder 1 and the impression cylinder 2 can be mounted in a common machine frame and designed to be displaceable with respect to one another, individually or coupled to one another. The actuating drive 14 is assigned a control device 15, via which the extent and the direction of the adjustment can be controlled. An output unit 13, via which a signal can be output for a deviation between a set point and an actual value of the application pressure or when a set point of an application pressure is reached, can also be provided on the control device 15.

In order to be able to measure the application pressure of the flexo printing element 11 with respect to the printing material support 2 or the printing material web 4 or, in order to be able to set a selected application pressure viewed as correct in a simple manner, an image capturing means 10 which records the printing material web 4 following the printing is provided, wherein the image capturing means 10, which is normally formed as a camera, is assigned an evaluation device 12, via which the image data can be checked with regard to position, shape and/or size or else color intensity.

The application pressure is checked via an acquisition of a printed image of a measuring element, which will be explained below.

Figure 2:
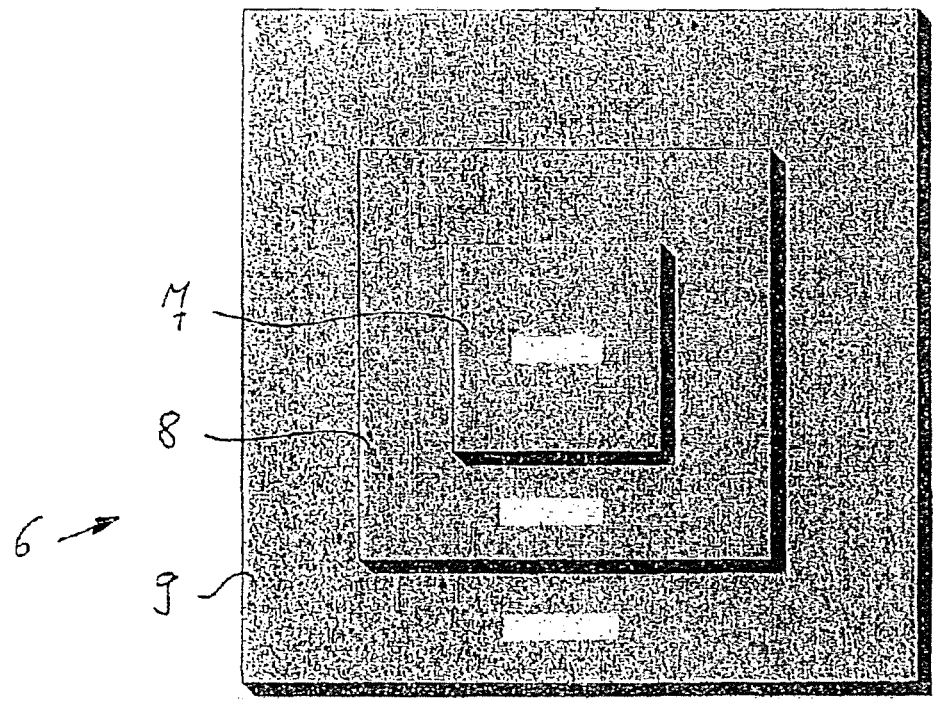
FIG. 2 shows a detailed view of a measuring element.

FIG. 2 shows an embodiment of a measuring element 6 according to the invention, which is arranged on a flexo printing element 11, advantageously beside the actual motif which is to be printed onto the printing material 4. The measuring element 6 in the exemplary embodiment illustrated provides three printing planes 7, 8, 9, which are formed so as to be elevated at different levels. The uppermost printing plane 7 is formed in the manner of a square and represents the tip of a pyramid-like structure. The first printing plane 7 prints first as soon as contact takes place with the printing material 4 after the flexo printing element 11, together with the measuring element 6, has been provided with ink via the engraved roll. If only the first printing plane 7 comes into contact with the printing material 4, as a rule the application pressure is not yet sufficiently high to ensure a uniform application of ink for the motif on the flexo printing element 11. The upper printing plane 7 can be arranged at the level of the printing surfaces of the flexo printing element 11, so that, during first contact with the printing material 4, a corresponding printed result both of the actual printing motif and of the measuring element is present.

Accordingly, a higher application pressure is set, which leads to compression of the elastic measuring element 6, so that the second printing plane 8 likewise participates in the printed image of the measuring element 6. If the second printing plane 8 of the measuring element 6 can be seen completely on the printing material 4, it can be assumed that the correct, previously defined, application pressure has been reached. The second printing plane 8 of the measuring element 6 is likewise configured in the manner of a square and also corresponds to the orientation of the first printing plane 6 but the area is enlarged as compared with the first printing plane 7.

If the application pressure is increased further, the third and lowest printing plane 9 comes into contact with the printing material 4. The third printing plane of the measuring element 6 likewise has a square shape in the same orientation as the printing planes 7 and 8 arranged so as to be elevated, and is likewise enlarged as compared with the second printing plane 8. If, via the image acquisition means 10, it is detected that the lowest printing plane 9 transfers ink to the printing material 4, this is an indication of the fact that the application pressure is too high and therefore the distance between the flexo printing element 11 and the printing material 4 and between the printing form cylinder 1 and the impression cylinder 2 should be enlarged.

The image capturing means 10 monitors the pressure or the application pressure continuously in that the region in which the measuring element 6 prints, for example an edge region of the printing material 4, is monitored by the image capturing means 10 formed as a camera. The data acquired by the camera is evaluated via an evaluation device 12 in terms of shape, orientation and/or size and possibly compared with previously stored patterns via a comparator 12a integrated in the evaluation device 12. If only the first printing plane 7 is printed and a corresponding printed image is acquired, a comparison can be performed in the evaluation device 12. In addition to a visual and/or acoustic output of the evaluation result or of the image acquired, it is possible to output a signal which outputs the fact that a desired and previously defined application pressure has been exceeded, reached, or not reached. For the purpose of automatic setting of the application pressure, via a control device 15 the evaluation device 12 can drive an actuating drive 14 for adjusting the distance between the printing form cylinder 1 and the impression cylinder 2.

In addition to a change in size of the printed image of the measuring element 6 via the printing planes 7, 8, 9 layered above one another in the manner of a pyramid, it is possible to provide different orientations of the printed images of the printing planes 7, 8, 9, so that easy detection of the respective application pressure can be achieved via the orientation. The respective printing plane of the measuring element 6 can be assigned a specific value of the application pressure or at least an increment of the application pressure value, so that, given a multi-stepped configuration of the measuring element 6, it is possible to detect the amount by which the application pressure must be enlarged or reduced or by what distance and in what direction the printing form cylinder 1 must be displaced in relation to the impression cylinder 2 in order to achieve the desired application pressure.

Figure 3:
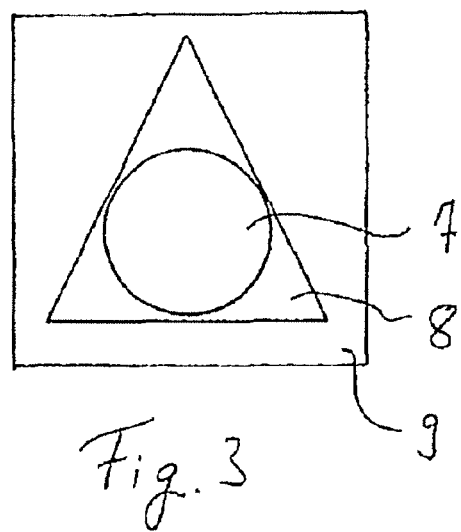
FIG. 3 shows a variant of the measuring element.

FIG. 3 shows a variant of the measuring element 6 in which different shapes are present in the different printing planes 7, 8, 9. The uppermost printing plane 7 is formed as a circle, the middle printing plane 8 is a triangle and the lower printing plane 9 is a square. Alternative shapes are of course possible, likewise different orders are possible, it being necessary to ensure that a change in the printed image in the different printing planes can be detected visually, which is regularly achieved in that, in the next deeper printing plane, a printing area is added or a proportion of the areas that projects in the projection transfers printing ink.

The different printing planes 7, 8, 9 can be arranged at equal intervals from one another; it is likewise possible that, in that printing plane which represents the correct application pressure, adjacent printing planes are arranged with a lower spacing than those further removed, in order to facilitate fine setting. It is also possible to provide more than three printing planes in order to permit finer setting.

The invention claimed is:

1. A measuring element arranged on a flexo printing element for controlling an application pressure with respect to a printing material support, comprising in a stepped configuration a plurality of printing planes arranged on the flexo printing element each having a printing area, wherein the printing planes having different sizes that are reduced in size relative to one another with respect to a height dimension passing through the plurality of printing planes, and wherein printing areas of adjacent printing planes are not fully covered by the adjacent printing planes, wherein on different application pressure a shape or size of the printing areas is different in the different printing planes.

2. The measuring element as claimed in claim 1, wherein the plurality of printing planes of are spaced apart uniformly from one another in the height dimension.

3. The measuring element as claimed in claim 1 wherein the measuring element is arranged beside a printing motif on the flexo printing element.

4. The measuring element as claimed in claim 1 wherein a shape of the printing areas is different in the different printing planes.

5. A device for determining and/or setting an application pressure of a flexo printing element with respect to a printing material support, comprising:
   a measuring element arranged on the flexo printing element, the measuring element comprising in a stepped configuration a plurality of printing planes each having a printing area, wherein the printing planes having different sizes that are reduced in size relative to one another with respect to a height dimension from the flexo printing element, and wherein printing areas of adjacent printing planes are not fully covered by the adjacent printing planes, and
   an imaging device which acquires one or more images of a printed image printed by the flexo printing element using the measuring element.

6. The device as claimed in claim 5, further comprising an evaluation device separate from or associated with the imaging device for evaluating image data obtained with the imaging device.

7. The device as claimed in claim 6, wherein the evaluation device includes or operates in conjunction with a comparator which compares the image data acquired with previously defined patterns or images.

8. The device as claimed in claim 5, further comprising an output unit which outputs a signal in an event of a deviation between a set point and an actual value or when a set point for image data from the measuring element is reached.

9. The device as claimed in claim 5 further comprising an actuator for changing an application pressure of the flexo printing element based on the one or more images of the printed image.

10. The device of claim 9 further comprising a controller for controlling the actuator based on the one or more images.

11. A method for controlling an application pressure of a flexo printing element with respect to a printing material support, comprising the steps of:

printing an image with a measuring element arranged on the flexo printing element, the measuring element comprising in a stepped configuration a plurality of printing planes of reduced size relative to a height from the flexo printing element and where printing areas of adjacent printing planes are not fully covered by the adjacent printing planes, wherein different application pressures applied by the flexo printing element during printing result in different images being printed; evaluating the printed image; and setting an application pressure of the flexo printing element with respect to the printing material support in accordance with the printed image.

12. The method as claimed in claim 11, wherein the application pressure is set in accordance with at least one of a size and a shape of the printed image.

13. The method as claimed in claim 11, wherein the step of evaluating the printed image includes the step of:
   capturing an image of the printed image; and
   evaluating the captured image by comparing the captured image to stored patterns or images.

14. The method as claimed in claim 13 wherein the evaluating step provides a signal to a controller which automatically sets the application pressure.

15. A method for using a measuring element arranged on a flexo printing element to determine an application pressure, comprising the step of printing an image with the measuring element arranged on the flexo printing element wherein the measuring element comprises in a stepped configuration a plurality of printing planes of reduced size relative to a height from the flexo printing element and where printing areas of adjacent printing planes are not fully covered by the adjacent printing planes, wherein upon different applications of pressure on the measuring element produces a shape or size of printing areas that are different due to the different printing planes.

* * * * *